(12) United States Patent
McKnew et al.

(10) Patent No.: US 12,187,267 B2
(45) Date of Patent: *Jan. 7, 2025

(54) SYSTEM FOR PARKING AN AUTONOMOUS VEHICLE

(71) Applicant: GM Cruise Holdings LLC, San Francisco, CA (US)

(72) Inventors: Jennifer Devar McKnew, Petaluma, CA (US); Ryan Holben, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,428

(22) Filed: Oct. 3, 2023

(65) Prior Publication Data

US 2024/0025394 A1 Jan. 25, 2024

Related U.S. Application Data

(63) Continuation of application No. 16/861,803, filed on Apr. 29, 2020, now Pat. No. 11,807,221.

(51) Int. Cl.
| | |
|---|---|
| *B60W 30/06* | (2006.01) |
| *B60W 40/06* | (2012.01) |
| *B60W 60/00* | (2020.01) |
| *G05D 1/00* | (2024.01) |

(52) U.S. Cl.
CPC ............ *B60W 30/06* (2013.01); *B60W 40/06* (2013.01); *B60W 60/00253* (2020.02); *G05D 1/0022* (2013.01); *B60W 2552/15* (2020.02); *B60W 2556/40* (2020.02); *B60W 2556/50* (2020.02); *B60W 2710/207* (2013.01)

(58) Field of Classification Search
CPC ................. B60W 30/06; B60W 40/06; B60W 60/00253; B60W 2556/40; B60W 2556/50; B60W 2710/207; G05D 1/0022; B62D 15/0285

See application file for complete search history.

(56) References Cited

U.S. PATENT DOCUMENTS

| | | | |
|---|---|---|---|
| 9,910,438 B1 | 3/2018 | Arden et al. | |
| 10,046,804 B2 | 8/2018 | Fendt | |
| 10,259,320 B1 * | 4/2019 | Reich | .................... F16H 63/486 |
| 2011/0276225 A1 | 11/2011 | Nefcy et al. | |
| 2012/0303222 A1 | 11/2012 | Troy et al. | |
| 2017/0129536 A1 * | 5/2017 | Xu | .......... B62D 6/001 |
| 2018/0339700 A1 * | 11/2018 | Lee | ....... G06V 20/588 |
| 2018/0345955 A1 | 12/2018 | Kim et al. | |
| 2019/0113933 A1 | 4/2019 | Ha et al. | |

* cited by examiner

*Primary Examiner* — Adam R Mott
*Assistant Examiner* — Alyzia N Dilworth

(57) ABSTRACT

The subject disclosure relates to features that improve safety for autonomous vehicle (AV) maneuvers and in particular, that improve safety for parallel parking. A process of the disclosed technology includes steps for initiating a parking maneuver, navigating the AV into a parking location, and detecting a roadway grade with respect to a direction of the AV. In some aspects, the process can further include steps for automatically adjusting a wheel angle of the AV based on the roadway grade with respect to the direction of the AV. Systems and machine-readable media are also provided.

20 Claims, 4 Drawing Sheets

SYSTEM FOR PARKING AN AUTONOMOUS VEHICLE

CROSS-REFERENCE TO RELATED APPLICATIONS

This application is a continuation of U.S. patent application Ser. No. 16/861,803, entitled "SYSTEM FOR PARKING AN AUTONOMOUS VEHICLE", filed on Apr. 29, 2020, the contents of which are incorporated herein by reference in their entirety.

BACKGROUND

1. Technical Field

The subject technology provides solutions for improving autonomous vehicle (AV) safety and in particular, for improving AV safety when performing parallel parking maneuvers.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
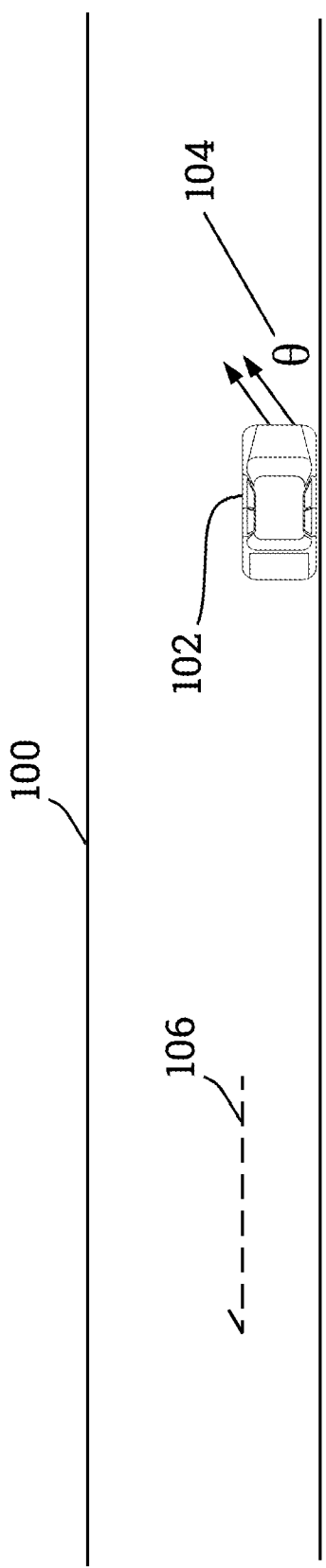
FIG. 1 illustrates an example of an autonomous vehicle (AV) performing a parallel parking maneuver on a road with an uphill grade, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

One challenge in parking on roadways with hills (e.g., graded roads) is the requirement that the vehicle's tires be angled appropriately to the grade. Such precautions are typically taken so that if the vehicle begins to move it does not roll into the roadway where it would obstruct or collide with other cars/traffic. Safety conventions, and most state vehicle codes, require that vehicles directed downhill maintain wheel angles pointed toward the curb, whereas vehicles parallel parking in an uphill direction have wheels pointed away from the curb e.g., toward the road. In the downhill scenario, having wheels aimed toward the curb ensures that, in the event that the vehicle beings to move, the vehicle rolls into the curb. In the uphill parking scenario, having wheels pointed away from the curb ensures that the vehicle rolls backward, into the curb. For both scenarios, it can be optimal to ensure that the base of at least one angled wheel is in contact with the adjacent curb when parking.

The aforementioned parallel parking maneuvers can be challenging for experienced human drivers, and pose a unique challenge for autonomous vehicles (AVs) where human drivers are conspicuously absent. Aspects of the disclosed technology address some of the limitations of implementing safe parallel parking maneuvers in an AV by providing features for determining a road grade (e.g., incline or decline), and for adjusting tire/wheel direction appropriately based on the current parking scenario.

In some embodiments, road inclination is determined by the AV through reference to a map database that includes prior information regarding road grade. Alternatively, road grade may be determined by the AV using one or more sensor systems, such as through the collection of environmental data using one or more Light Detection and Ranging (LiDAR sensors), and/or cameras. Using road grade, tire rotation detection can be determined. For example, if the AV is pointed in a downhill direction, then tire rotation should be in the clockwise direction, if parking on the right side of the road, or in the counterclockwise direction, if parking on the left side of the road. Oppositely, if the AV is pointed in an uphill direction, then tire rotation should be in the counterclockwise direction, if parking on the right side of the road, and in the clockwise direction, if parking on the left side of the road. As discussed in further detail below, wheel rotation angle and/or wheel-to-curb contact can be determined by a feedback/control system on the AV, for example, that is coupled to the AV's navigation system, which is responsible for manipulating/modifying the AV wheel angle.

FIG. 1 illustrates an example of an autonomous vehicle (AV) 102 performing a parallel parking maneuver on a road 100 with an uphill grade, according to some aspects of the disclosed technology. In the example of FIG. 1, AV 102 is positioned in an uphill direction on roadway 100, as indicated by grade arrow 106, indicating a direction of descending grade for roadway 100. In the example configuration, AV 102 parks on a right-side of roadway 100, with wheels pointed away from the curb, as indicated by wheel angle 104. In some embodiments, a navigation system of AV 102 positions the vehicle adjacent to a curb of roadway 100, and then adjusts a wheel angle based on the detected grade of the roadway, relative to the direction of AV 102. A feedback and control system of AV 102 (not illustrated) can continue to adjust wheel angle, until a proper angle (e.g., wheel angle 104) is achieved. In some aspects, the wheel angle can be increased until it is determined that a wheel adjacent to the curbside has achieved contact with a curb or other edge of the roadway surface. By ensuring contact between at least one wheel and the curb, movement (rolling) of the vehicle can be minimized in the event of parking or emergency brake failure.

By way of example, in the uphill parking scenario illustrated with respect to roadway 100, AV 102 can be configured to rotate the wheels until the desired wheel angle (Θ) 104 is obtained. In some implementations, there may be a predetermined minimum threshold angle, such as 40 degrees, above which, wheel rotation is completed.

In a further example, in the downhill parking scenario illustrated with respect to roadway 200, AV 202 can be configured to rotate the wheels until the desired wheel angle (Θ) 204 is obtained. In some implementations, there may be a predetermined minimum threshold angle, such as 45 degrees, above which, wheel rotation is completed. Additionally, wheel rotation may continue until it is determined, (e.g., by a control system of the AV), that wheels are touching the curb. It is understood that in both of the foregoing examples, different predetermined thresholds may be implemented with respect to the wheel angle. Such thresholds may be based on a variety of factors, including the road grade, AV characteristics, or user/operator preferences, etc.

Figure 2:
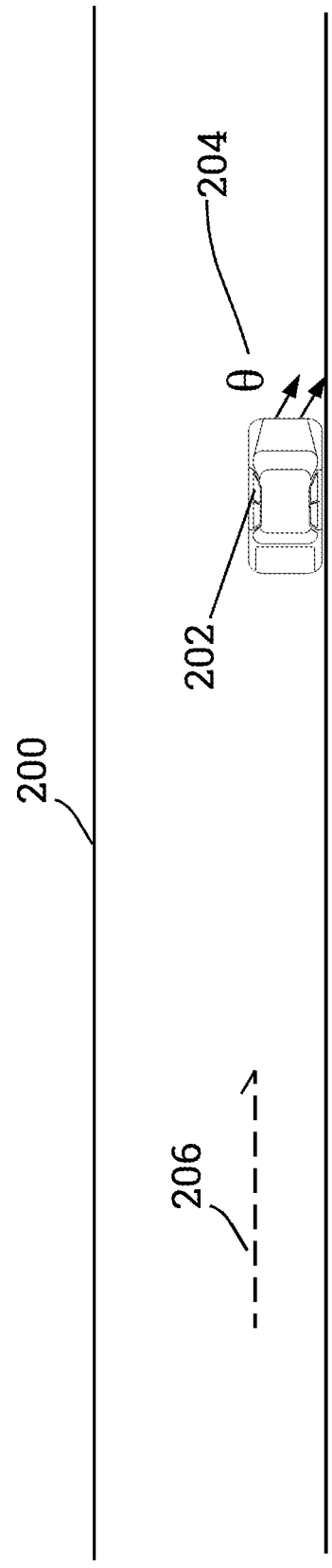
FIG. 2 illustrates an example of an AV performing a parallel parking maneuver on a road with a downhill grade, according to some aspects of the disclosed technology.

FIG. 2 illustrates an example of an AV performing a parallel parking maneuver on a road with a downhill grade, according to some aspects of the disclosed technology. In the example of FIG. 2, AV 202 is positioned in a downhill direction on roadway 200, as indicated by grade arrow 206, indicating a direction of descending grade for roadway 200. In the example configuration, AV 202 parks on a right-side of roadway 200, with wheels pointed toward the curb, as indicated by wheel angle 204. Similar to the example described with respect to FIG. 1, a navigation system of AV 202 positions the vehicle adjacent to a curb of roadway 200, and then adjusts a wheel angle based on the detected grade of the roadway.

Figure 3:
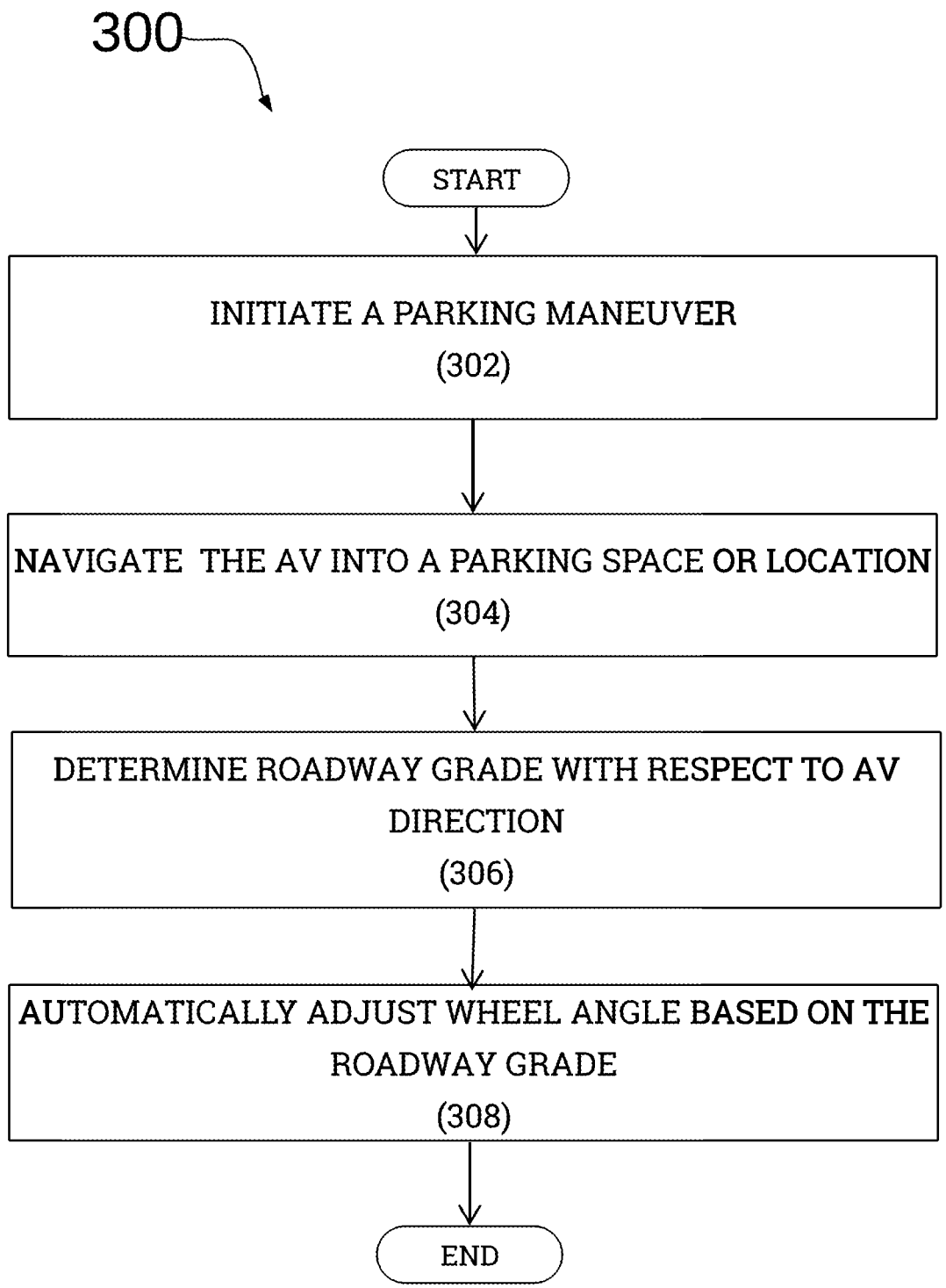
FIG. 3 illustrates steps of an example process for executing a parallel parking maneuver by an AV, according to some aspects of the disclosed technology.

FIG. 3 illustrates steps of an example process 300 for executing a parallel parking maneuver by an AV, according to some aspects of the disclosed technology. Process 300 begins with step 302 in which a parking maneuver is initiated, for example, by navigation and planning logic of the AV.

In step 304, the AV is navigated into the identified parking space. Navigation into the parking space can include maneuver functions needed to position the AV sufficiently close to a curbside adjacent to the desired parking space.

In step 306, a roadway grade is determined with respect to the AV direction. Further to the examples described above with respect to FIGS. 1 and 2, grade can be determined (or identified) based on map prior information, and/or determined based on AV sensor data collected for the surrounding environment. In some aspects, the roadway grade may be compared to a predetermined threshold below which wheel angle adjustments (tire rotation) is not performed. However, in some aspects, if the grade exceeds the pre-determined threshold, the tire angle adjustments can be implemented, as discussed below with respect to step 308. By way of example, if the predetermined threshold is 20%, then a roadway grade of 15% would not result in an automatic wheel angle adjustment. However, in this example, a roadway grade of 22% may result in automatic adjustments to wheel angle. It is understood that the predetermined grade threshold may be automatically determined based on a number of factors, including but not limited to: map location, AV characteristics, and/or weather conditions. The predetermined grade threshold may also be set manually, or determined based on user/rider preferences, etc.

In step 308, the wheel angle of the AV is automatically adjusted based on the road way grade and the AV direction. That is, as discussed above, the road grade can be used to determine a direction of rotation desired with respect to the AV. Further to the example of FIGS. 1 and 2, the wheels/tires can be rotated in a clockwise direction if the AV is oriented in a downhill direction and the parking maneuver is performed on the right side of the roadway. Alternatively, the wheels may be rotated in a counter-clockwise direction if the AV is oriented in a downhill direction and the parking maneuver is performed on the left side of the roadway. Furthermore, the wheels may be rotated in a counter-clockwise direction if the AV is oriented in an uphill direction and the parking maneuver is performed on the right-side of the road. The wheels can be rotated in the clockwise direction if the AV is oriented in an uphill direction and the parking maneuver is performed on the left-side of the road.

Figure 4:
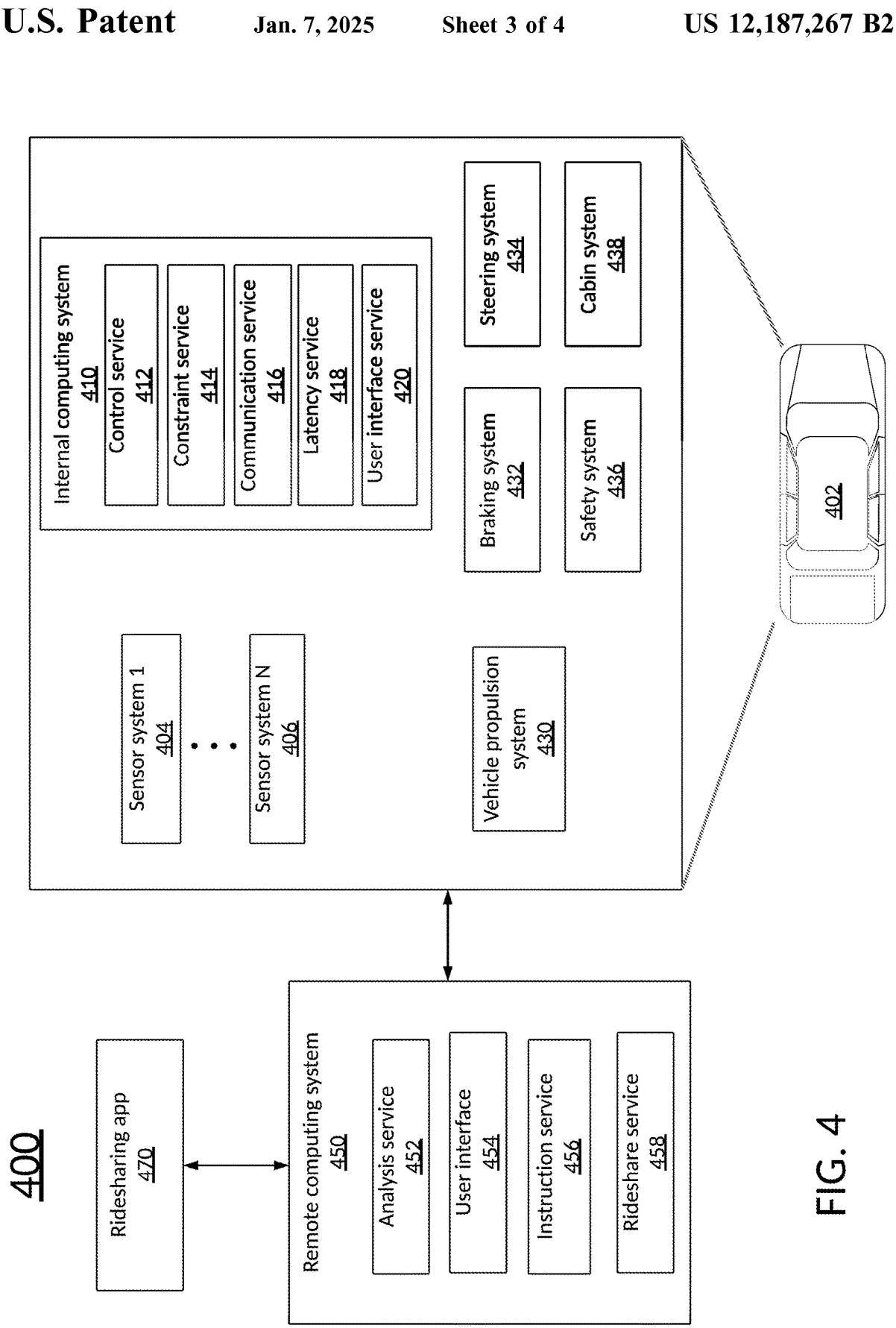
FIG. 4 illustrates an example system environment that can be used to facilitate AV dispatch and operations, according to some aspects of the disclosed technology.

FIG. 4 illustrates an example system environment that can be used to facilitate AV dispatch and operations, according to some aspects of the disclosed technology. Autonomous vehicle 402 can navigate about roadways without a human driver based upon sensor signals output by sensor systems 404-406 of autonomous vehicle 402. Autonomous vehicle 402 includes a plurality of sensor systems 404-406 (a first sensor system 404 through an Nth sensor system 406). Sensor systems 404-406 are of different types and are arranged about the autonomous vehicle 402. For example, first sensor system 404 may be a camera sensor system and the Nth sensor system 406 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 480 are illustrated coupled to the autonomous vehicle 402, it is understood that more or fewer sensors may be coupled to the autonomous vehicle 402.

Autonomous vehicle 402 further includes several mechanical systems that are used to effectuate appropriate motion of the autonomous vehicle 402. For instance, the mechanical systems can include but are not limited to, vehicle propulsion system 430, braking system 432, and steering system 434. Vehicle propulsion system 430 may include an electric motor, an internal combustion engine, or both. The braking system 432 can include an engine brake, brake pads, actuators, and/or any other suitable componentry that is configured to assist in decelerating autonomous vehicle 402. In some cases, braking system 432 may charge a battery of the vehicle through regenerative braking. Steering system 434 includes suitable componentry that is configured to control the direction of movement of the autonomous vehicle 402 during navigation. Autonomous vehicle 402 further includes a safety system 436 that can include various lights and signal indicators, parking brake, airbags, etc. Autonomous vehicle 402 further includes a cabin system 438 that can include cabin temperature control systems, in-cabin entertainment systems, etc.

Autonomous vehicle 402 additionally comprises an internal computing system 410 that is in communication with sensor systems 480 and systems 430, 432, 434, 436, and 438. Internal computing system 410 includes at least one processor and at least one memory having computer-executable instructions that are executed by the processor. The computer-executable instructions can make up one or more services responsible for controlling autonomous vehicle 402, communicating with remote computing system 450, receiving inputs from passengers or human co-pilots, logging metrics regarding data collected by sensor systems 480 and human co-pilots, etc.

Internal computing system 410 can include a control service 412 that is configured to control operation of vehicle propulsion system 430, braking system 208, steering system 434, safety system 436, and cabin system 438. Control service 412 receives sensor signals from sensor systems 480 as well communicates with other services of internal computing system 410 to effectuate operation of autonomous vehicle 402. In some embodiments, control service 412 may carry out operations in concert one or more other systems of autonomous vehicle 402. Internal computing system 410 can also include constraint service 414 to facilitate safe propulsion of autonomous vehicle 402. Constraint service 416 includes instructions for activating a constraint based on a rule-based restriction upon operation of autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 412.

The internal computing system 410 can also include communication service 416. The communication service 416 can include both software and hardware elements for transmitting and receiving signals from/to the remote computing system 450. Communication service 416 is configured to transmit information wirelessly over a network, for example, through an antenna array that provides personal cellular (long-term evolution (LTE), 3G, 4G, 5G, etc.) communication.

Internal computing system 410 can also include latency service 418. Latency service 418 can utilize timestamps on communications to and from remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, latency service 418 can enable other systems of autonomous vehicle 402 or a passenger to make necessary decisions or to provide the needed feedback.

Internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 440 regarding reporting data for training and evaluating machine learning algorithms, requesting assistance from remote computing system 450 or a human operator via the remote computing system 450, software service updates, rideshare pickup and drop off instructions, etc.

Remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402. Remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

Remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402. Remote computing system 450 can also include rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc. Remote computing system 450 can, in some cases, include at least one computing system 450 as illustrated in or discussed with respect to FIG. 5, or may include at least a subset of the components illustrated in FIG. 5 or discussed with respect to computing system 450.

Figure 5:
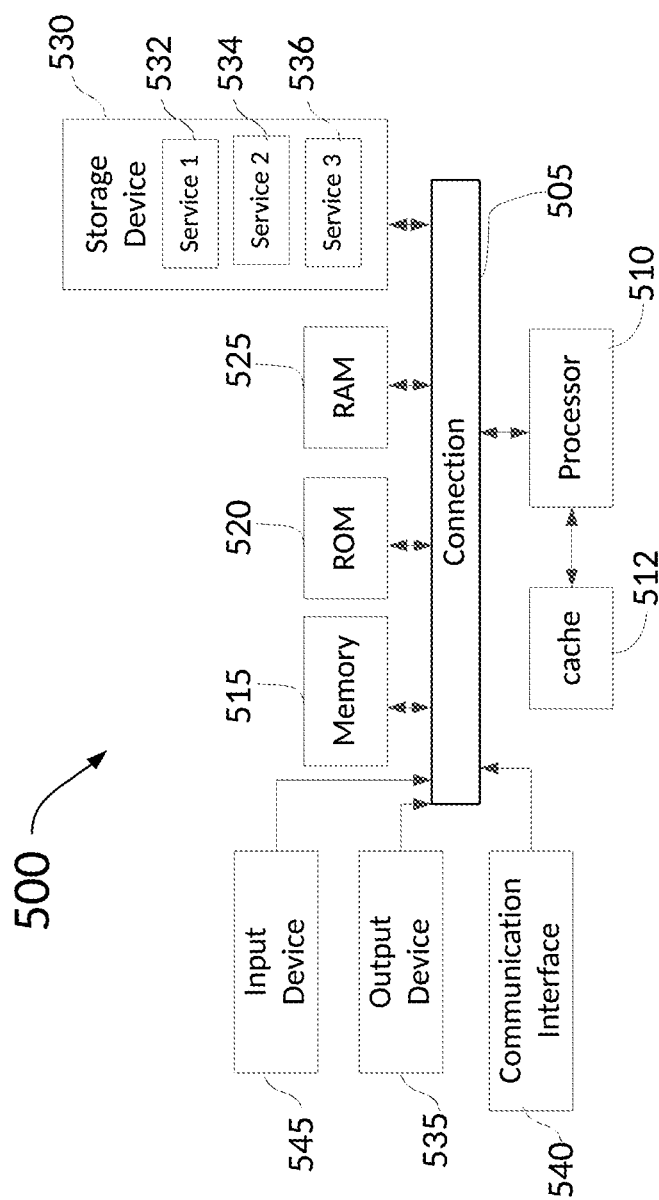
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 410, remote computing system 450, a passenger device executing the rideshare app 470, internal computing device 430, or any component thereof in which the components of the system are in communication with each other using connection 505. Connection 505 can be a physical connection via a bus, or a direct connection into processor

510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 5 illustrates an example processor-based system with which some aspects of the subject technology can be implemented. Specifically, FIG. 5 illustrates system architecture 500 wherein the components of the system are in electrical communication with each other using a bus 505. System architecture 500 can include a processing unit (CPU or processor) 510, as well as a cache 512, that are variously coupled to system bus 505. Bus 505 couples various system components including system memory 515, (e.g., read only memory (ROM) 520 and random access memory (RAM) 525, to processor 510.

System architecture 500 can include a cache of high-speed memory connected directly with, in close proximity to, or integrated as part of the processor 510. System architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. Memory 515 can include multiple different types of memory with different performance characteristics. Processor 510 can include any general purpose processor and a hardware module or software module, such as module 1 (532), module 2 (534), and module 3 (536) stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems can enable a user to provide multiple types of input to communicate with the computing system architecture 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include software modules 532, 534, 536 for controlling processor 510. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, output device 535, and so forth, to carry out various functions of the disclosed technology.

By way of example, instruction stored on computer-readable media can be configured to cause one or more processors to perform operations including: receiving, at an AV computing system, a first dispatch request, wherein the first dispatch request is associated with a first user identifier (ID), receiving, at the AV computing system, a first recognition model, wherein the first recognition model corresponds with the first user ID, receiving, at the AV computing system, an image stream comprising one or more images of pedestrian faces, and providing the one or more images to the first recognition model. In some aspects, the instructions can further cause processors 510 to perform operations for: determining, using the first recognition model, if a first user represented in the one or more images corresponds with the first user ID, unlocking a door of the AV in response to a match between at least one of the one or more images and the first user ID, and/or updating the first recognition model in response to a match between at least one of the one or more images and the first user ID.

In some aspects, memory stored operations/instructions can be configured to further cause processors 510 to perform operations for: receiving a second recognition model corresponding with a second user ID, providing the one or more images to the second recognition model, and determining, using the second recognition model, if a second user represented by the one or more images corresponds with the second user ID. In some approaches, the operations may further cause the processors to perform operations for unlocking a door of the AV in response to a match between at least one of the one or more images and the second user ID.

Depending on the desired implementation, the first recognition model can be a machine-learning model that has been trained using a plurality of facial images of the first user, and wherein the second recognition model is a machine-learning model that has been trained using a plurality of facial images of the second user.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computing system comprising:
one or more processors; and
a computer-readable medium comprising instructions stored therein, which when executed by the one or more processors, cause the one or more processors to:
while an autonomous vehicle (AV) is in a parking location, detect a roadway grade of a roadway with respect to a direction of the AV, the roadway grade comprising a roadway incline or a roadway decline with respect to the direction of the AV;
determine a threshold roadway grade comprising a threshold incline or a threshold decline with respect to the direction of the AV, the threshold roadway grade being determined based on at least one of a map location associated with the roadway and one or more AV characteristics; and
automatically adjust a wheel angle of the AV based on a determination that the roadway grade exceeds the threshold roadway grade.

2. The computing system of claim 1, wherein the one or more processors are further configured to:
initiate one or more parking maneuver operations.

3. The computing system of claim 1, wherein the threshold roadway grade is further based on weather conditions.

4. The computing system of claim 1, wherein the one or more processors are further configured to:
determine whether the roadway grade exceeds the threshold roadway grade.

5. The computing system of claim 1, wherein to detect the roadway grade, the one or more processors are further configured to:
collect environmental data using one or more AV sensors; and
determine the roadway grade based on the environmental data.

6. The computing system of claim 1, wherein to detect the roadway grade, the one or more processors are further configured to:
determine the roadway grade based on a location of the AV and a map database.

7. The computing system of claim 4, wherein to automatically adjust the wheel angle of the AV, the one or more processors are further configured to:
adjust the wheel angle toward a curb that is adjacent to the AV based on the determination that the roadway grade exceeds the threshold roadway grade.

8. A computer-implemented method comprising:
while an autonomous vehicle (AV) is in a parking location, detecting a roadway grade of a roadway with respect to a direction of the AV, the roadway grade comprising a roadway incline or a roadway decline with respect to the direction of the AV;
determining a threshold roadway grade comprising a threshold incline or a threshold decline with respect to the direction of the AV, the threshold roadway grade being determined based on at least one of a map location associated with the roadway and one or more AV characteristics; and
automatically adjusting a wheel angle of the AV based on a determination that the roadway grade exceeds the threshold roadway grade.

9. The computer-implemented method of claim 8, further comprising:
initiating one or more parking maneuver operations.

10. The computer-implemented method of claim 8, wherein the threshold roadway grade is further based on weather conditions.

11. The computer-implemented method of claim 8, further comprising:
determining whether the roadway grade exceeds the threshold roadway grade.

12. The computer-implemented method of claim 8, wherein detecting the roadway grade includes:
collecting environmental data using one or more AV sensors; and
determining the roadway grade based on the environmental data.

13. The computer-implemented method of claim 8, wherein detecting the roadway grade includes:
determining the roadway grade based on a location of the AV and a map database.

14. The computer-implemented method of claim 11, wherein automatically adjusting the wheel angle of the AV includes:
adjusting the wheel angle toward a curb that is adjacent to the AV based on the determination that the roadway grade exceeds the threshold roadway grade.

15. A non-transitory computer-readable storage medium comprising instructions stored therein, which when executed by one or more processors, cause the one or more processors to perform operations comprising:
while an autonomous vehicle (AV) is in a parking location, detecting a roadway grade of a roadway with respect to a direction of the AV, the roadway grade comprising a roadway incline or a roadway decline with respect to the direction of the AV;

determining a threshold roadway grade comprising a threshold incline or a threshold decline with respect to the direction of the AV, the threshold roadway grade being determined based on at least one of a map location associated with the roadway and one or more AV characteristics; and automatically adjusting a wheel angle of the AV based on a determination that the roadway grade exceeds the threshold roadway grade.

16. The non-transitory computer-readable storage medium of claim 15, wherein the one or more processors are further configured to perform operations comprising:
initiating one or more parking maneuver operations.

17. The non-transitory computer-readable storage medium of claim 15, wherein the threshold roadway grade is further based on weather conditions.

18. The non-transitory computer-readable storage medium of claim 15, wherein the one or more processors are further configured to perform operations comprising:
determine whether the roadway grade exceeds the threshold roadway grade.

19. The non-transitory computer-readable storage medium of claim 15, detecting the roadway grade, includes:
collecting environmental data using one or more AV sensors; and
determining the roadway grade based on the environmental data.

20. The non-transitory computer-readable storage medium of claim 18, wherein automatically adjusting the wheel angle of the AV includes:
adjusting the wheel angle toward a curb that is adjacent to the AV based on the determination that the roadway grade exceeds the threshold roadway grade.

* * * * *